United States Patent
Liles et al.

(10) Patent No.: US 11,268,393 B2
(45) Date of Patent: Mar. 8, 2022

(54) VANE RETENTION FEATURE

(71) Applicant: UNITED TECHNOLOGIES CORPORATION, Farmington, CT (US)

(72) Inventors: Howard J. Liles, Newington, CT (US); Bryan P. Dube, Columbia, CT (US); Bryan H. Farrar, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/689,529

(22) Filed: Nov. 20, 2019

(65) Prior Publication Data

US 2021/0148241 A1    May 20, 2021

(51) Int. Cl.
    *F01D 9/04*      (2006.01)

(52) U.S. Cl.
    CPC .......... *F01D 9/042* (2013.01); *F05D 2230/64* (2013.01); *F05D 2260/30* (2013.01)

(58) Field of Classification Search
    CPC . F01D 9/04; F01D 9/041; F01D 9/042; F01D 25/246; F05D 2260/30; F05D 2240/128; F05D 2230/64
    See application file for complete search history.

(56) References Cited

U.S. PATENT DOCUMENTS

| | | | |
|---|---|---|---|
| 3,362,681 A | 1/1968 | Smuland | |
| 4,422,827 A * | 12/1983 | Buxe | F01D 11/006 415/173.7 |
| 7,874,795 B2 | 1/2011 | Burdgick et al. | |
| 9,343,467 B2 | 9/2016 | Mackie et al. | |
| 10,370,986 B2 | 8/2019 | Heitman et al. | |
| 10,370,990 B2 | 8/2019 | Reynolds et al. | |
| 2011/0311353 A1 | 12/2011 | Arness et al. | |
| 2013/0052030 A1* | 2/2013 | McCaffrey | C04B 35/80 416/241 B |
| 2016/0201488 A1* | 7/2016 | Carr | F01D 9/041 415/209.4 |

FOREIGN PATENT DOCUMENTS

EP      3683405      7/2020

OTHER PUBLICATIONS

The Extended European Search Report for European Patent Application No. 20208571.8, dated Mar. 19, 2021.

* cited by examiner

*Primary Examiner* — Woody A Lee, Jr.
*Assistant Examiner* — Maxime M Adjagbe
(74) *Attorney, Agent, or Firm* — Carlson, Gaskey & Olds, P.C.

(57) ABSTRACT

An airfoil assembly includes an airfoil. The airfoil has first and second platforms and an airfoil between the first and second platforms. A support ring is configured to retain the first platform. The support ring has a lip which extends radially inward from the support ring. The lip is configured to engage an axial face of the first platform. The lip has a primary retention feature and a secondary retention feature. The primary and secondary retention features are configured to retain the first face of the first platform with respect to the annular ring. A support structure for an airfoil and a method of retaining an airfoil assembly are also disclosed.

19 Claims, 3 Drawing Sheets

VANE RETENTION FEATURE

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Any of the fan section, the turbine section, and the compressor section include airfoils, such as for fan, compressor, or turbine blades. Baffles are known and used in cooled gas turbine engine airfoils, such as turbine vanes. Typically, a baffle is situated in a cavity in the airfoil and serves to distribute cooling air to precise locations in the airfoil.

SUMMARY

An airfoil assembly according to an exemplary embodiment of this disclosure, among other possible things includes an airfoil. The airfoil has first and second platforms and an airfoil between the first and second platforms. A support ring is configured to retain the first platform. The support ring has a lip which extends radially inward from the support ring. The lip is configured to engage an axial face of the first platform. The lip has a primary retention feature and a secondary retention feature. The primary and secondary retention features are configured to retain the first face of the first platform with respect to the annular ring.

In a further example of the foregoing, the primary retention feature includes a sloped surface on the lip. The sloped surface is configured to mate with a sloped surface on a face of the first platform.

In a further example of any of the foregoing, the sloped surface on the lip is sloped with respect to a radial direction of the support ring.

In a further example of any of the foregoing, the secondary retention feature includes a secondary lip which extends from a radially inward end of the sloped surface of the lip.

In a further example of any of the foregoing, the first platform is a radially outer platform.

In a further example of any of the foregoing, the first platform includes a plurality of ceramic matrix composite plies is arranged perpendicular to a radial direction of the airfoil.

In a further example of any of the foregoing, a second support ring is configured to retain the second platform.

In a further example of any of the foregoing, the lip is a first lip. The first lip engages a first axial face of the first platform. The support ring further includes a second lip which is configured to engage a second axial face of the first platform.

In a further example of any of the foregoing, the first axial face is an aft face and the second axial face is a forward face.

In a further example of any of the foregoing, a location feature is configured to radially locate the airfoil with respect to the support ring.

A support structure for an airfoil according to an exemplary embodiment of this disclosure, among other possible things includes an annular ring. The annular ring has a first axial side and a second axial side opposite the first axial side. The first and second lips extend radially towards the center of the annular ring from the first and second axial sides respectively. The first lip has a primary retention feature and a secondary retention feature. The primary and secondary retention features are configured to retain a platform of an airfoil with respect to the annular ring.

In a further example of the foregoing, the primary retention feature includes a sloped surface on the first lip. The sloped surface is configured to mate with a sloped surface on a face of the airfoil platform.

In a further example of any of the foregoing, the sloped surface is sloped with respect to a radial direction of the annular ring.

In a further example of any of the foregoing, the secondary retention feature includes a secondary lip which extends from a radially inward end of the sloped surface of the first lip.

In a further example of any of the foregoing, the support ring includes a groove which is configured to receive a tongue on the platform to locate the airfoil with respect to the support ring.

A method of retaining an airfoil assembly according to an exemplary embodiment of this disclosure, among other possible things includes retaining an airfoil platform with respect to a support ring via a lip, which extends radially inward from the support ring. The lip is configured to engage an axial face of the platform. The lip has a primary retention feature and a secondary retention feature. The primary and secondary retention features are configured to retain the axial face of the platform with respect to the support ring.

In a further example of the foregoing, the primary retention feature includes a sloped surface on the first lip. The sloped surface is configured to mate with a sloped surface on a face of the airfoil platform.

In a further example of any of the foregoing, the sloped surface is sloped with respect to a radial direction of the support ring.

In a further example of any of the foregoing, the secondary retention feature includes a secondary lip which extends from a radially inward end of the sloped surface of the lip.

In a further example of any of the foregoing, the airfoil platform is located with respect to the support thing by locating a tongue on the airfoil platform in a groove of the support ring.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
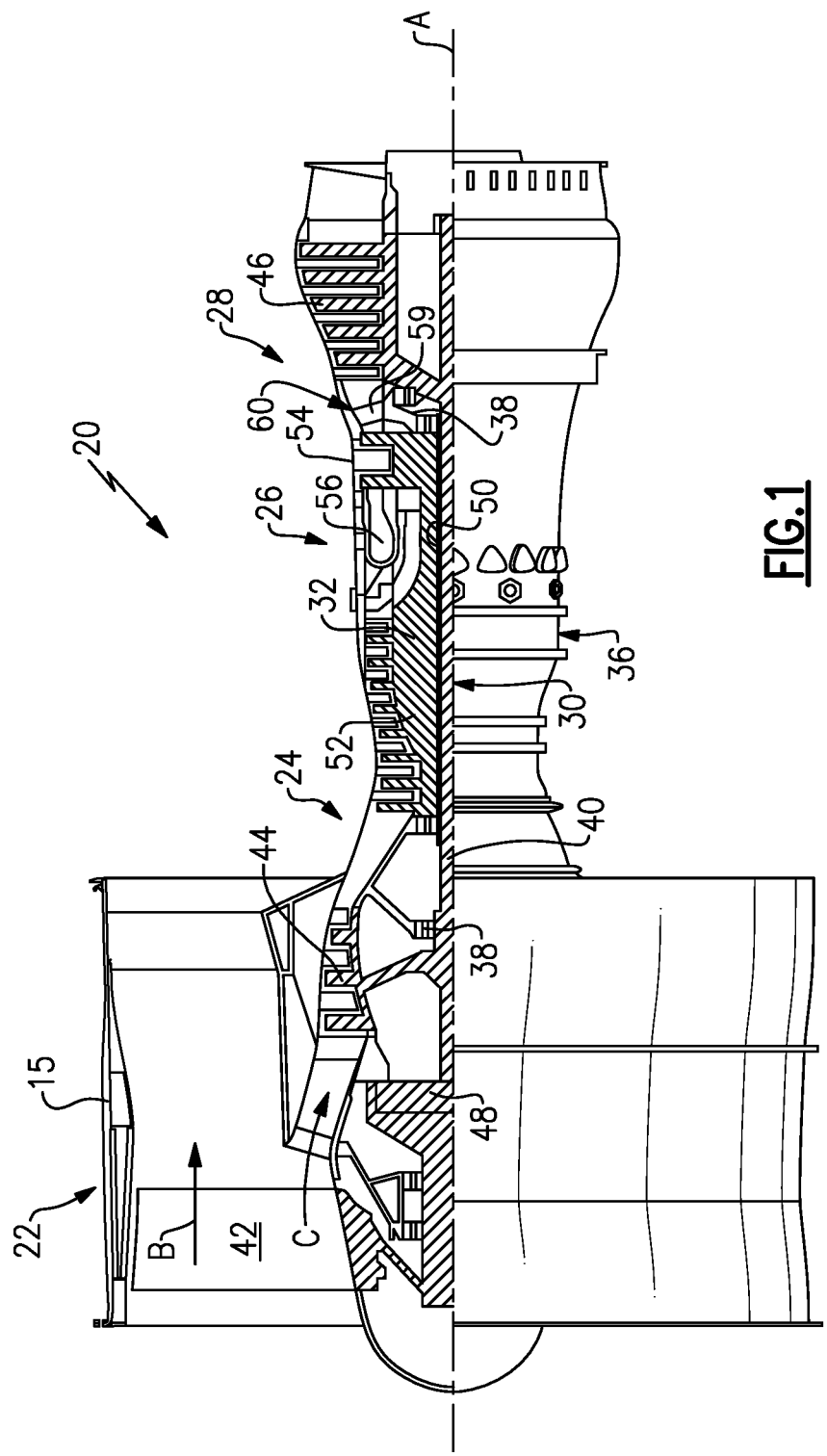
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. Terms such as "axial," "radial," "circumferential," and variations of these terms are made with reference to the engine central axis A. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°R)]^{0.5}$. The "Low corrected fan tip speed" as disclosed herein according to one non-limiting embodiment is less than about 1150 ft/second (350.5 meters/second).

Figure 2:
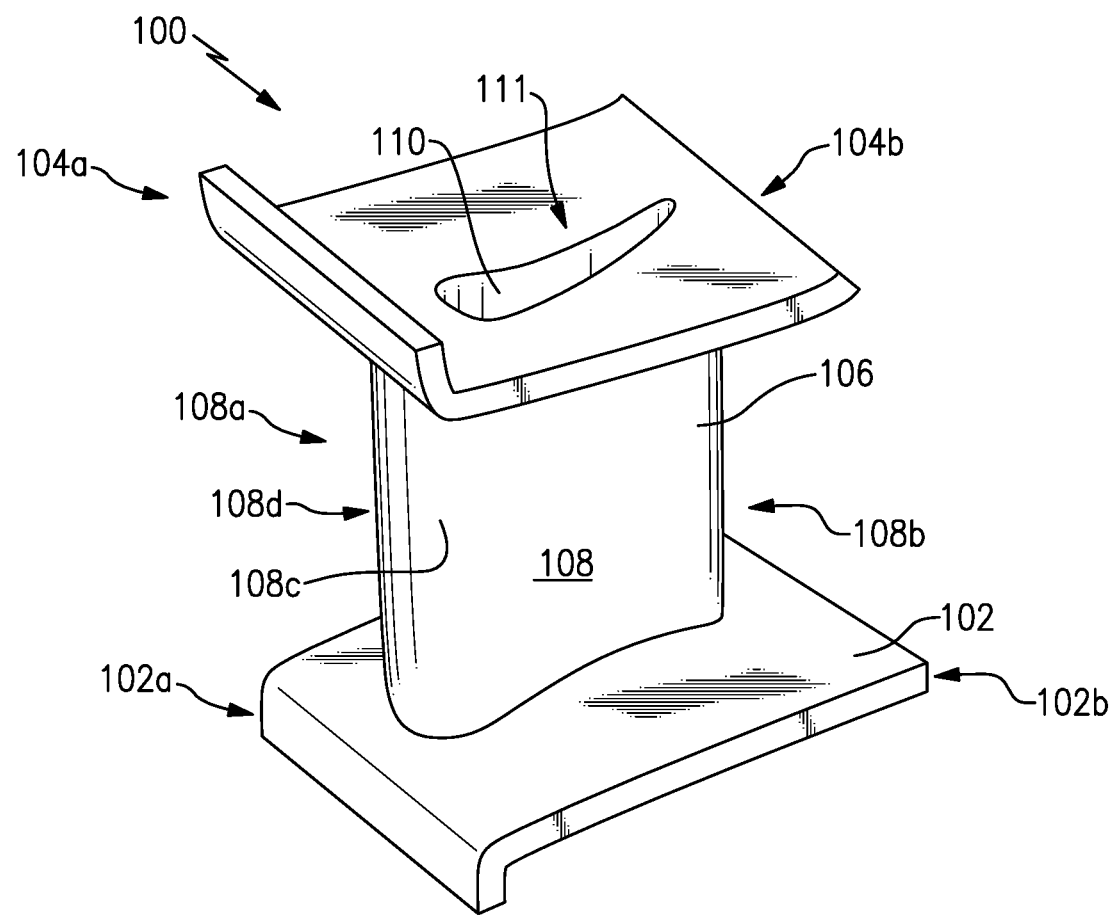
FIG. 2 is a schematic view of an airfoil for the example gas turbine engine of FIG. 1.

FIG. 2 schematically shows an airfoil 100 from the turbine section 28 of the engine 20. A plurality of airfoils 100 are situated in a circumferential row about the engine central axis A. The airfoil 100 includes a first or inner platform 102, a second or outer platform 104, and an airfoil section 106 that spans between the inner and outer platforms 102/104. FIG. 3 shows a cross-sectional view of the airfoil section 106 along the section line A-A in FIG. 2. The airfoil section 106 includes an airfoil outer wall 108 that delimits the profile of the airfoil section 106. The outer wall 108 defines a leading end 108a, a trailing end 108b, and first and second sides 108c/108d (FIG. 3) that join the leading and trailing ends 108a/108b. In this example, the first side 108c is a pressure side and the second side 108d is a suction side. The outer wall 108 circumscribes an internal cavity 110. The cavity 110 may be a single cavity or a sub-cavity, for example. The cavity 110 can be configured to receive a baffle or spar (not shown).

In one example, the airfoil 100 is formed of a ceramic material, such as a ceramic matrix composite (CMC) material. For example, the CMC includes a ceramic matrix and ceramic fibers disposed in the ceramic matrix. The ceramic matrix may be, but is not limited to, silicon carbide (SiC) and the ceramic fibers may be, but are not limited to, silicon carbide (SiC) fibers. The CMC is comprised of fiber plies that are arranged in a stacked configuration and formed to the desired geometry of the airfoil 100. For instance, the fiber plies may be layers or tapes that are laid-up one on top of the other to form the stacked configuration. The fiber plies may be woven or unidirectional, for example. At least a portion of the fiber plies are continuous through the platforms 102/104 and the airfoil section 106. In this regard, the airfoil 100 is a continuous body in that the fiber plies are uninterrupted through the platforms 102/104 and the airfoil section 106. The airfoil 100 may also be a monolithic ceramic material, such as a silicon-containing ceramic. Examples of such ceramics include silicon nitride and silicon carbide.

Figure 3B:
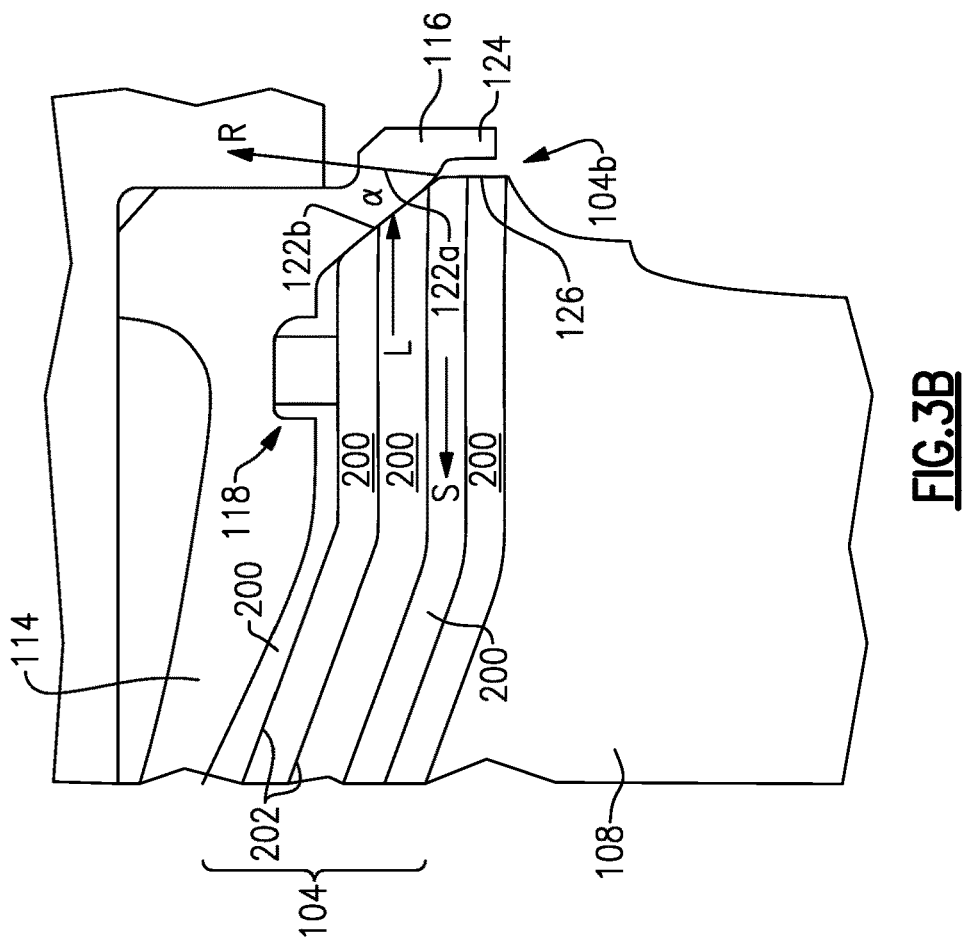
FIG. 3B is a detail view of the airfoil and support structure of FIG. 3A.
Figure 3A:
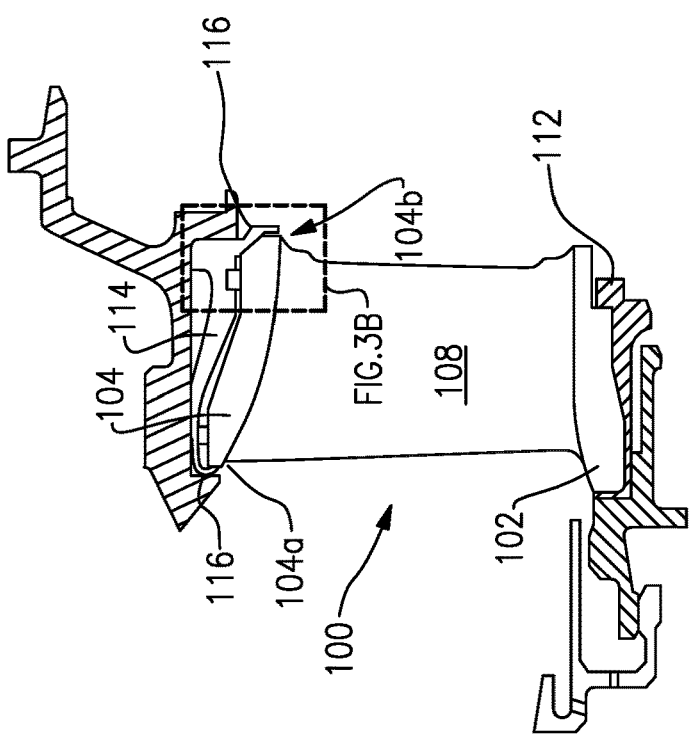
FIG. 3A is a schematic view of an airfoil for the example gas turbine engine of FIG. 1 in a support structure.

Referring to FIGS. 3A-B, the airfoil 100 is shown in the turbine section 28 (though the airfoil 100 could be in other section in other examples, as discussed above). The platforms 102/104 are supported in inner and outer annular support rings 112/114, respectively. The inner and outer support rings 112/114 are connected to static structures in the engine 20. The platforms 102/104 each have a forward axial face 102a/104a and an aft axial face 104a/104b. As best shown in FIG. 3A, the outer support ring 114 includes a retention feature in the form of lips 116 which engages the forward face 104a and aft face 104b of the outer platform 104. In general, the lips 116 extend from the outer support ring 114 in a radially inward direction to capture the outer platform 104.

Referring to FIG. 3B, the outer platform 104 is comprised of plies 200 of CMC material, as discussed above. Interlaminar regions 202 are defined between adjacent plies.

With continued reference to FIG. 3B, in one example, the outer platform 104/outer support ring 114 include a location feature 118 which locates the outer platform 104 with respect to the outer support ring 114. The location feature 118 can include a shim which is configured to radially locate the vane, in some examples.

The outer platform 104 includes a primary and secondary retention feature. The primary retention features includes a pair of mating sloped surfaces 122a/122b. The mating sloped surface 122a/122b are angled with respect to the radial direction R by an angle α. The first sloped surface 122a is on the aft end 104b of the outer platform 104. The second sloped surface 122b is on the lip 116. The outer platform 104 experiences loads L perpendicular to the radial direction R as shown in FIG. 3B. The sloped surfaces 122a/122b counteract the loads L to retain the outer platform 104 with respect to the outer support ring 114.

The secondary retention feature is a secondary lip 124 extending radially inward from the lip 116. The secondary lip 124 extends from a radially inward end of the mating surface 122b. The secondary lip 124 is situated to engage a radial surface 126 of the forward edge 104b of the platform 104 which is radially inward from the sloped surface 122a in the event that the primary retention feature 122a/122b is lost or otherwise becomes inoperable. In one example, the secondary lip 124 extends substantially to a radially innermost extend of the outer platform 104.

In particular, in the event of partial loss of the primary retention feature 122a/122b, the outer platform 104 may experience a shear force S opposite the load L shown in FIG. 3B. The plies 200 are generally arranged parallel to the shear force S and load L. The shear force S could contribute to interlaminar stresses at interlaminar regions 202 between individual plies 200 of the CMC material of the platform 104. This is especially true when the shear force S is higher in some radial areas of the outer platform 104 as compared to other radial areas, e.g., in the event of a partial loss of the primary retention feature 122a/122b, were the load L and thus shear force S are not evenly distributed to adjacent plies 200. These interlaminar stresses, if large enough, could have the potential to delaminate the plies 200 from one another, which in turn could lead to damage in the outer platform 104. Also, the secondary lip 124 prevents the airfoil 100 from liberating from the outer support ring 114 due to load L in the event of full failure of the primary retention feature 122a/122b.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An airfoil assembly, comprising:
   first and second platforms;
   an airfoil between the first and second platforms; and
   a support ring configured to retain the first platform, the support ring having a lip extending radially inward from the support ring, the lip configured to engage an axial face of the first platform, wherein the lip has a primary retention feature and a secondary retention feature, the primary and secondary retention features configured to retain the axial face of the first platform with respect to the support ring, wherein the primary retention feature includes a sloped surface on the lip, the sloped surface configured to mate with a sloped surface on the axial face of the first platform and wherein the sloped surface on the lip is sloped with respect to a radial direction of the support ring.

2. The airfoil assembly of claim 1, wherein the secondary retention feature includes a secondary lip extending from a radially inward end of the sloped surface of the lip.

3. The airfoil assembly of claim 2, wherein the secondary lip extends in a direction that is parallel to the radial direction of the support ring.

4. The airfoil assembly of claim 2, wherein the secondary lip is configured to engage a radial surface of the axial edge of the platform, and wherein the radial surface is radially inward from the sloped surface.

5. The airfoil assembly of claim 4, wherein engagement of the radial surface and the secondary lip prevents the airfoil assembly from liberating from the support ring independent of the primary retention feature.

6. The airfoil assembly of claim 1, wherein the first platform is a radially outer platform.

7. The airfoil assembly of claim 1, wherein the first platform comprises a plurality of ceramic matrix composite plies arranged perpendicular to a radial direction of the airfoil.

8. The airfoil assembly of claim 1, further comprising a second support ring configured to retain the second platform.

9. The airfoil assembly of claim 1, wherein the lip is a first lip, and the first lip engages a first axial face of the first platform, and wherein the support ring further comprises a second lip configured to engage a second axial face of the first platform.

10. The airfoil assembly of claim 9, wherein the first axial face is an aft face and the second axial face is a forward face.

11. The airfoil assembly of claim 1, further comprising a location feature configured to radially locate the airfoil with respect to the support ring.

12. The airfoil assembly of claim 1, wherein an angle between a sloped surface of the lip and the radial direction of the support ring is less than 90 degrees.

13. The airfoil assembly of claim 1, wherein the platform experiences a load perpendicular to the radial direction of the support ring, and wherein the primary retention feature counteracts the load for retaining the first platform.

14. A support structure for an airfoil, comprising:
an annular ring, the annular ring having a first axial side and a second axial side opposite the first axial side, and first and second lips extending radially towards the center of the annular ring from the first and second axial sides, respectively, wherein the first lip has a primary retention feature and a secondary retention feature, the primary and secondary retention features configured to retain a platform of the airfoil with respect to the annular ring, wherein the primary retention feature includes a sloped surface on the first lip, the sloped surface configured to mate with a sloped surface on an axial face of the platform, and wherein the sloped surface on the first lip is sloped with respect to a radial direction of the annular ring.

15. The support structure of claim 14, wherein the secondary retention feature includes a secondary lip extending from a radially inward end of the sloped surface of the first lip.

16. The support structure of claim 14, wherein the support ring includes a groove configured to receive a tongue on the platform to locate the airfoil with respect to the support ring.

17. A method of retaining an airfoil assembly, comprising:
retaining an airfoil platform with respect to a support ring via a lip extending radially inward from the support ring, the lip configured to engage an axial face of the platform, wherein the lip has a primary retention feature and a secondary retention feature, the primary and secondary retention features configured to retain the axial face of the platform with respect to the support ring, wherein the primary retention feature includes a sloped surface on the lip, the sloped surface configured to mate with a sloped surface on the axial face of the platform and wherein the sloped surface on the lip is sloped with respect to a radial direction of the support ring.

18. The method of claim 17, wherein the secondary retention feature includes a secondary lip extending from a radially inward end of the sloped surface of the lip.

19. The method of claim 17, further comprising locating the airfoil platform with respect to the support ring by locating a tongue on the airfoil platform in a groove of the support ring.

* * * * *